(12) United States Patent
Fröberg Olsson et al.

(10) Patent No.: US 10,892,874 B2
(45) Date of Patent: Jan. 12, 2021

(54) DISCARDING AND RETAINING PHYSICAL DATA CHANNELS

(71) Applicant: Telefonaktiebolaget L M Ericsson (publ), Stockholm (SE)

(72) Inventors: Jonas Fröberg Olsson, Ljungsbro (SE); Erik Eriksson, Linköping (SE); Pål Frenger, Linköping (SE); Martin Hessler, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 819 days.

(21) Appl. No.: 14/832,199

(22) Filed: Aug. 21, 2015

(65) Prior Publication Data

US 2017/0054541 A1 Feb. 23, 2017

(51) Int. Cl.
*H04L 5/00* (2006.01)
*H04L 1/18* (2006.01)
*H04W 72/04* (2009.01)

(52) U.S. Cl.
CPC .......... *H04L 5/0055* (2013.01); *H04L 1/1838* (2013.01); *H04L 1/1877* (2013.01); *H04W 72/044* (2013.01)

(58) Field of Classification Search
CPC ... H04L 5/0055; H04L 1/1877; H04L 1/1838; H04W 72/044
See application file for complete search history.

(56) References Cited

U.S. PATENT DOCUMENTS 8,726,308 B2 5/2014 Chen et al.
2002/0041592 A1 4/2002 Van Der Zee et al.
(Continued)

FOREIGN PATENT DOCUMENTS

CN 102684818 A 9/2012
CN 101345609 B 1/2013
(Continued)

OTHER PUBLICATIONS

First Chinese Office Action for Chinese Patent Application No. 201680062373.9 dated Jun. 3, 2020, 10 pages (including English translation).

*Primary Examiner* — Charles C Jiang
*Assistant Examiner* — Voster Preval
(74) *Attorney, Agent, or Firm* — Sage Patent Group

(57) ABSTRACT

A first channel for carrying Layer 2 messages carries data that will not be retransmitted and for which decoding-related information need not be retained by the receiving node in the event of an unsuccessful decoding of the data, while a second channel carries data that will be retransmitted in the event that a negative acknowledgement is received by the transmitting node. In an example method, first and second subsets of Layer 2 messages are received on first and second physical data channels, respectively. Decoding-related information for unsuccessfully decoded messages in the first subset is retained for use with subsequent retransmissions, while decoding-related information for unsuccessfully decoded messages in the second subset is discarded without waiting for retransmissions. Acknowledgements or negative acknowledgements are sent for messages in the first subset, but may or may not be sent for messages in the second subset, in various embodiments.

32 Claims, 7 Drawing Sheets

(56) References Cited

U.S. PATENT DOCUMENTS

| | | | |
|---|---|---|---|
| 2004/0039979 A1* | 2/2004 | Garani | H04L 1/1845 714/752 |
| 2007/0153672 A1* | 7/2007 | Terry | H04L 1/0025 370/206 |
| 2009/0016265 A1* | 1/2009 | Katayama | H04L 1/1819 370/328 |
| 2011/0296268 A1* | 12/2011 | Ao | H04L 1/1838 714/748 |
| 2012/0239998 A1* | 9/2012 | Park | H04L 1/1812 714/748 |
| 2012/0243509 A1* | 9/2012 | Popovski | H04W 28/04 370/331 |
| 2013/0044699 A1* | 2/2013 | Eriksson | H04W 72/1289 370/329 |
| 2013/0100833 A1* | 4/2013 | Xu | H04W 52/42 370/252 |
| 2013/0148584 A1* | 6/2013 | Zhu | H04L 1/1893 370/328 |
| 2014/0050148 A1* | 2/2014 | Choi | H04L 1/1819 370/328 |
| 2014/0254351 A1* | 9/2014 | Newman | H04L 1/1809 370/228 |
| 2015/0009989 A1* | 1/2015 | Han | H04L 45/16 370/390 |
| 2015/0043473 A1* | 2/2015 | Kim | H04L 1/1812 370/329 |
| 2016/0048115 A1* | 2/2016 | Nakamura | H04L 41/0833 700/11 |
| 2017/0251473 A1* | 8/2017 | Xue | H04W 72/0446 |

FOREIGN PATENT DOCUMENTS

| | | | | |
|---|---|---|---|---|
| CN | 103873173 A | 6/2014 | | |
| CN | 104472002 A | 3/2015 | | |
| CN | 101325540 A | 12/2018 | | |
| EP | 1655879 A1 * | 5/2006 | | H04L 1/1671 |

* cited by examiner

DISCARDING AND RETAINING PHYSICAL DATA CHANNELS

TECHNICAL FIELD

The present invention generally relates to wireless communications, and particularly relates to the use of physical data channels in a wireless link to communicate Layer 2 (link layer) messages.

BACKGROUND

In a wireless network, a variety of different types of information is communicated between network nodes, such as between a user equipment (UE) and a base station. This information can include control information, for managing and optimizing the wireless connection, and user data information of various kinds.

The $3^{rd}$-Generation Partnership Project (3GPP) has developed standards for a fourth-generation wireless communications technology referred to as "Long Term Evolution" (LTE) or, more formally, the Evolved Universal Terrestrial Radio Access Network (E-UTRAN). In an LTE network, the Physical Downlink Control Channel (PDCCH) and the Enhanced Physical Downlink Control Channel (ePDCCH) are physical downlink control channels used to send downlink and uplink grants, which are specifications indicating to the UE, respectively, how transmissions to the UE on the Physical Downlink Shared Channel (PDSCH) are formatted and how transmissions from the UE on the Physical Uplink Shared Channel (PUSCH) should be formatted. On PDSCH and PUSCH, both control data and user data are multiplexed by the Medium Access Control (MAC) layer, and thus these physical data channels may be understood to carry Layer 2 messages. However, some uplink control messages (i.e., uplink control information, or UCI), such as downlink hybrid automatic repeat request (HARQ) feedback and channel state information (CSI) reports, are either sent on the Physical Uplink Control Channel (PUCCH) or are multiplexed by the physical layer on the PUSCH resource, in which case the PUSCH is rate matched around the UCI.

As of Release 12 of the 3GPP specifications for LTE, all Layer 2 data sent to the UE on the PDSCH is "retransmittable," in the sense that the UE will respond with a HARQ feedback indicating whether or not the PDSCH transmission was correctly decoded. In the event that the data was not correctly decoded, the UE stores information related to the decoding to combine with future transmissions on the same HARQ process. If an assignment with a toggled new data indicator is received, the old data for that HARQ process is discarded.

SUMMARY

While all Layer 2 data sent via the PDSCH in LTE systems is re-transmittable, as discussed above, this is not optimal for all types and categories of Layer 2 messages. Embodiments of the present invention address this problem by providing for two distinct physical data channels or subchannels for carrying Layer 2 data. A first channel, which can be referred to as a "direct" channel or a "discarding" channel, carries data that may or may not be retransmitted, but for which decoding-related information is not retained by the receiving node in the event of an unsuccessful decoding of the data. A second channel, which can be referred to as a "re-transmittable" channel or a "retaining" channel, carries retransmittable data, i.e., data that will be retransmitted in the event that a negative acknowledgement is received by the transmitting node (or, in some cases, in the event that an acknowledgement is not received), and for which decoding-related information can be retained by the receiving node in the event of an unsuccessful decoding of the data, for use in combining with decoding-related information obtained when decoding the corresponding retransmitted data.

A first aspect of the present invention is related to methods, in a first wireless node for receiving a set of Layer 2 (L2) messages from a second wireless node, using first and second physical data channels. An example method according to this aspect includes receiving, from the second wireless node, a first subset of the L2 messages on the first physical data channel, and receiving, from the second wireless node, a second, mutually exclusive, subset of the L2 messages on the second physical data channel. The method further includes retaining decoding-related information for unsuccessfully decoded messages in the first subset, for use with subsequent retransmissions of the unsuccessfully decoded messages. Decoding-related information for unsuccessfully received messages in the second subset, however, is discarded, without waiting for retransmission of the unsuccessfully received messages.

One or more acknowledgements or negative acknowledgements are transmitted to the second wireless node for messages in the first subset, in the example method summarized above, but may or may not be transmitted for messages in the second subset, in various embodiments. In some embodiments, one or more acknowledgements or negative acknowledgements for received messages in the second subset are transmitted, e.g., for use by the second wireless node in performing link adaptation.

According to some embodiments of this first aspect, the method includes, prior to receiving the first and second subsets of L2 messages, transmitting to the second wireless node a configuration message indicating, for at least one of the first and second subsets of L2 messages, at least one data flow or category of data that should be mapped to the at least one of the first and second subsets of L2 messages.

In some of these and in some other embodiments, the method further includes transmitting one or more grant messages allocating transmission resources to the second wireless node for each of the first and second physical data channels, prior to receiving the first and second subsets of L2 messages, where the receiving of the first and second subsets of the L2 messages is performed using the allocated transmission resources. In some other embodiments, the method comprises receiving, along with the first and second subsets of L2 messages, one or more scheduling grants indicating transmission resources allocated to each of the first and second physical data channels.

In some embodiments, the receiving of the first and second subsets of L2 messages comprises, for at least one message in the second subset, performing a plurality of decoding attempts in a predetermined search space to find the one message in the second subset. In some of these embodiments, resource assignment information for a message in the first subset is determined from the one message in the second subset, and the message in the first subset is received, using this resource assignment information.

In some embodiments, the first and second subsets of L2 messages are decoded using first and second decoding algorithms, respectively, one of the first and second decoding algorithms having a higher spectral efficiency than the other. Similarly, in some embodiments the first and second subsets of L2 messages are decoded using first and second decoding algorithms, respectively, one of the first and second decoding algorithms having a higher complexity than the other.

A second aspect of the present invention is thus related to methods, in a first wireless node, for transmitting a set of Layer 2 (L2) messages to a second wireless node, using first and second physical data channels. In an example method according to this aspect, a first subset of the L2 messages is transmitted on the first physical data channel and a second, mutually exclusive, subset of the L2 messages is transmitted on the second physical data channel, where the first and second subsets are determined by one or more mapping rules. Each unsuccessfully decoded message in the first subset is retained, for possible re-transmission, until receipt of the corresponding message by the second wireless node is acknowledged. The method further includes refraining from re-transmitting at least some messages in the second subset of messages that are unsuccessfully decoded by the second wireless node.

In some embodiments, this refraining from re-transmitting at least some unsuccessfully received messages in the second subset of messages comprises discarding each message in the second subset, without waiting for acknowledgment of receipt of the corresponding message by the second wireless node. In other embodiments, this refraining from re-transmitting at least some unsuccessfully received messages in the second subset of messages comprises refraining from re-transmitting one or more messages for which negative acknowledgements are received from the second wireless node—this may be based on determining that each of the one or more messages is no longer up to date, for example.

In some embodiments of this example method, one or more of the mapping rules is predetermined, according to an industry standard. In some of these and in some other embodiments of this example method, one or more of the mapping rules are obtained, prior to the transmitting of the first and second subsets of L2 messages, by receiving a configuration message that indicates, for at least one of the first and second subsets of L2 messages, at least one data flow or category of data that should be mapped to the at least one of the first and second subsets of messages. In these embodiments, then, a plurality of data flows or a plurality of categories, or both, are mapped to the first and second subsets of L2 messages, in accordance with the configuration message.

In some embodiments, the example method summarized above further includes, prior to said transmitting of the first and second subsets of L2 messages, classifying each of a plurality of data items according to traffic type and selectively mapping data items to the first and second subsets of L2 messages according to the traffic types for the data items and according to one or more of the mapping rules. This classifying may be based, for example, on one or more of the following: latency requirements for one or more of the data items; decoding error probabilities for one or more of the data items; and delivery criticalities for one or more of the data items.

In some embodiments, one or more grant messages allocating transmission resources to the first wireless node for each of the first and second physical data channels are received, prior to the transmitting of the first and second subsets of L2 messages, and the transmitting of the first and second subsets of the L2 messages is performed using the allocated transmission resources. In some embodiments, the first and second subsets of L2 messages are encoded using first and second encoding algorithms, respectively, one of the first and second encoding algorithms having a higher spectral efficiency than the other—in these embodiments, the transmitting of the first and second subsets of L2 messages comprises transmitting the encoded messages resulting from said encoding. Similarly, in some embodiments, the first and second subsets of L2 messages are encoded using first and second encoding algorithms, respectively, one of the first and second encoding algorithms having a higher complexity than the other. Again, the transmitting of the first and second subsets of L2 messages in these embodiments comprises transmitting the encoded messages resulting from said encoding.

While in some embodiments no acknowledgements or negative acknowledgements are sent or received for messages in the second subset of L2 messages, in other embodiments the methods summarized above may further comprise obtaining one or more acknowledgements and/or negative acknowledgements for messages in the second subset of L2 messages and adjusting one or more transmission parameters for the second physical data channel, based on the received acknowledgements and/or negative acknowledgements. In contrast, in some embodiments, negative acknowledgements are received for one or more messages in the first subset of L2 messages, and those messages in the first subset of L2 messages that correspond to the received negative acknowledgements are retransmitted.

A third aspect of the present invention is related to a wireless device for receiving a set of Layer 2 (L2) messages from a second wireless device, using first and second physical data channels. An example wireless device according to this aspect comprises a radio transceiver, and processing circuit configured to control the radio transceiver and to receive from the second wireless device, using the radio transceiver, a first subset of the messages on the first physical data channel and a second, mutually exclusive, subset of the messages on the second physical data channel. The processing circuit is further configured to transmit one or more acknowledgements or negative acknowledgements to the second wireless device for messages in the first subset, using the radio transceiver, and to retain decoding-related information for unsuccessfully decoded messages in the first subset, for use with subsequent retransmission of the unsuccessfully decoded messages. However, the processing circuit is configured to discard decoding-related information for unsuccessfully decoded messages in the second subset, without waiting for retransmissions of the unsuccessfully decoded messages. The several variations of the methods summarized above in connection with the second aspect are equally applicable to this fourth aspect.

A fourth aspect of the present invention is related to a wireless device for sending a set of Layer 2 (L2) messages to a second wireless device, using first and second physical data channels. An example wireless device according to this aspect comprises a radio transceiver, and processing circuit configured to control the radio transceiver and to transmit a first subset of the L2 messages on the first physical data channel and transmit a second, mutually exclusive, subset of the L2 messages on the second physical data channel, using the radio transceiver, where the first and second subsets are determined by one or more mapping rules. The processing circuit is further configured to retain each message in the first subset until receipt of the corresponding message by the second wireless device is acknowledged and to refrain from re-transmitting at least some messages in the second subset of messages that are unsuccessfully decoded by the second wireless node. In some embodiments, this means that each message in the second subset is discarded, without waiting for acknowledgement of receipt of the corresponding message by the second wireless device. The several variations of the methods summarized above in connection with the first aspect are equally applicable to this aspect.

Further aspects of the present invention are directed to computer program products corresponding to the methods summarized above and implementations of the above-summarized wireless devices. Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
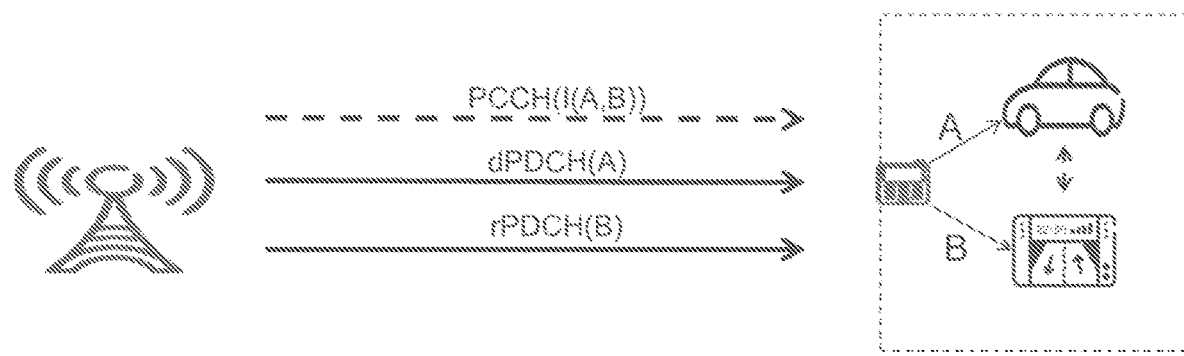
FIG. 1 illustrates a first example scenario using direct and retransmittable channels.

As noted above, as of Release 12 of the 3GPP specifications for LTE, all data sent on the PDSCH is retransmittable in the sense that the UE will respond with a HARQ feedback indicating whether the PDSCH transmission was correctly decoded or not. If the HARQ feedback indicates that the PDSCH transmission was not correctly decoded, the eNB (3GPP terminology for a base station) will transmit the message again. The UE stores information related to the first decoding attempt to combine with future re-transmissions on the same HARQ process. If an assignment with a toggled new data indicator is received the old data for that HARQ process is discarded.

For some time-critical application data, this re-transmission process is of no use, since data arrival after a re-transmission would be too late. In such applications, the HARQ feedback just gives unnecessary overhead. Further, because the coding (turbo-code) for the message transmission was designed with HARQ retransmissions in mind, the initial transmissions will have an quite high error probability even with an adjusted link adaptation, in some cases only slightly better than the un-coded error rate.

In other cases control information can be valid for a long time and hence benefit from utilizing the most spectral efficient transmission mode. Hence for some types of control information the re-transmittable channel might be more suitable, since on average this will be the most efficient.

Embodiments of the present invention address this lack of flexibility in current systems for transmitting Layer 2 (L2) messages by providing two physical data channels or sub-channels. A first channel, which can be referred to as a "direct" or "discarding" channel, carries data for which decoding-related information need not be retained by the receiving node in the event of an unsuccessful decoding of the data. This direct channel might be referred to as a direct Physical Downlink Channel, or dPDCH, for example. A second channel, which can be referred to as a "re-transmittable" or "retaining" channel, carries retransmittable data, i.e., data that will be retransmitted in the event that a negative acknowledgement is received by the transmitting node (or, in some cases, in the event that an acknowledgement is not received), and for which decoding-related information can be retained by the receiving node in the event of an unsuccessful decoding of the data, for use in combining with decoding-related information obtained when decoding the corresponding retransmitted data. This retransmittable channel might be referred to as a retransmittable Physical Downlink Channel, or rPDCH, for example. The direct and retransmittable channels can each carry both control and user data information.

Aspects of the present invention, as explained in further detail below, include processes and apparatuses for dynamically mapping data units, referred to herein generically as "messages," to the direct and retransmittable channels, by the means of mapping rules and communicated input parameters to the rules. An advantage provided by several embodiments is that information can be selectively coded with or without HARQ. This allows the characteristics and requirements associated with different types or categories of data to be better matched to the properties of the respective channels.

For example, the direct channel, i.e., the channel in which the receiver does not retain decoding-related data for unsuccessfully decoded messages, for soft combining of retransmissions, can be optimized for low error rate in a single transmission; hence it is very good for all data transmission that should arrive to the user with low latency and possibly with low error rate. Hence we get better performance for such transmissions, for example, control messages (e.g., $10^{-2}$-$10^{-4}$ BLER), Critical-MTC data transmissions (e.g., $10^{-4}$-$10^{-9}$ BLER).

The direct channel can also be used for transmissions for which there is little or no benefit to retransmitting in the event of unsuccessful reception. This includes, for example, channel quality indicator (CQI) reports, delay sensitive packets (e.g., voice-over-Internet Protocol packets), or other situations where it is better to send an updated data packet with newer information than to retransmit an unsuccessfully received message.

The retransmittable channel, with soft HARQ combining of transmissions, can be optimized for non-delay sensitive information, hence achieving better spectral efficiency for bulk data or other best effort data.

According to several embodiments of the processes and apparatuses described herein, data elements are mapped to either a first or a second channel where the two channels have different characteristics. The data elements referred to here may be packets, transport blocks, protocol data units (PDUs), or the like, and are generically referred to herein as messages. A first one of these channels, the retransmittable channel or rPDCH, has one or more of the following properties compared to the second channel, the direct channel or dPDCH:

support for more HARQ retransmissions (or other soft combining techniques);
a more spectral efficient coding;

a coding with a higher "error floor" is used, e.g., a code having a smaller minimum distance between a fraction of the codewords, while the average distance is larger;
a higher decoding complexity; and
a longer transmission duration, e.g., to achieve time diversity.

One or more mapping rules are used for mapping data elements, or messages, to the respective channels. The rules may be executed in a transmitting node, e.g., a UE or base station, or in a separate node that signals the mapping decision. In some embodiments, the mapping is characterized by assessing the criteria for the message in terms of, for example, a strict or soft delay budget and the probability measure to with the delay budget should be met. In these embodiments, if the assessment concludes that the delay/reliability-budget is sufficient for the rPDCH data is mapped there, otherwise the data is mapped the dPDCH. As another example, a mapping rule may depend on one or more current conditions, instead of or in addition to the message type. For example, a mapping rule might specify that if a measured Doppler shift for the received signal is larger than D, thus implying movement at greater than a certain speed, then CSI reports should be sent on the direct channel, since CSI information will change quickly and would therefore be "out of date" before any retransmission could occur, while otherwise CSI reports should be sent on re-transmittable channel. Such rules may be explicitly hardcoded in the standard or they may be dynamically or semi-statically configured.

It will be appreciated that this complete assessment may not be carried out in real time, in all embodiments. In some embodiments, predetermined rules, whether established by standardization or by configuration messages sent from one node to the other, may specify that certain types or categories of data are to be mapped to one channel or the other, where these predetermined rules reflect the time-criticality or reliability requirements generally associated with each of the types or categories.

FIG. 1 illustrates an example of the use of the two channels for handling time-critical and non-critical data. Time-critical data in the illustrated example includes navigation data sent to a "self-driving" car, and is designated with an "A." Non-time-critical data, designated with a "B," includes map update information for navigation system. The time-critical data in this example is sent by the direct channel (dPDCH), and is highly encoded to ensure reliable reception. The non-critical data, on the other hand, is sent via the retransmittable channel (rPDCH), and may be less heavily encoded.

Information specifying the mapping of the data to the two channels, i.e., resource grant information, may be sent via a control channel, designated PCCH in FIG. 1. However, the dashed arrow for PCCH illustrates that for some embodiments there is no PCCH. An approach in which the messages are found via blind decoding of messages in a search space is described below.

In the scenario illustrated in FIG. 1, the critical data, i.e., the "A" data, will not be retransmitted. In some systems, however, it may be desirable to know whether or not the dPDCH is correctly received. Thus, a mechanism is needed in some embodiments to allow for detecting whether the dPDCH is correctly received. In some embodiments, this detection may be performed by detecting an unsuccessful reception by an implicit indicator. For example, the dPDCH may include something to which the receiving node is expected to respond, albeit without an explicit ACK/NACK indication. For instance, the dPDCH may be used to send an uplink resource grant to a UE, to which there is no response. In this case, the base station detects the UE's failure to decode by detecting that there was no transmission in the assigned resources.

In other embodiments, the UE (or other receiving node) can explicitly transmit an ACK/NACK that indicates whether or not the dPDCH was decoded correctly, in response to messages sent on the direct channel, but neither node expects a retransmission of unsuccessfully decoded messages. In these embodiments, the feedback associated with the dPDCH may be viewed as a "reception indicator," rather than as a "retransmission indicator." Thus, the sending node in these embodiments can use the ACK/NACK indication for adapting a transmission parameter (i.e., adapting the link), even though it has not saved the unsuccessfully received data for retransmission. Likewise, the receiving node in this case does not anticipate a retransmission and thus does not save decoding-related information for the unsuccessfully decoded message for combining with subsequent retransmissions. In other words, in some embodiments neither node maintains a HARQ process retransmission process for the direct channel, even though acknowledgements or negative acknowledgements are used—these acknowledgements or negative acknowledgements are used only for link adaption.

It will be appreciated that whether a certain type of data is delay sensitive or not may often depends on the circumstances. Channel quality feedback can, for example, benefit from the additional reliability provided by HARQ in the circumstance that both the transmitter and receiver are static, as may be the case in a backhaul link, or in the event that a user terminal is moving very slowly, as may be the case in a radio link between a base station and a laptop terminal. Hence, for some types of information the decision to map it to a direct channel or to a re-transmittable channel may be more dynamic, based on one or more mapping rules that depend on, for instance, the channel Doppler estimation or the expected transmission duration for the data. The mapping rules may take the current bandwidth, link adaptation, and/or system load into account, as well.

Figure 2:
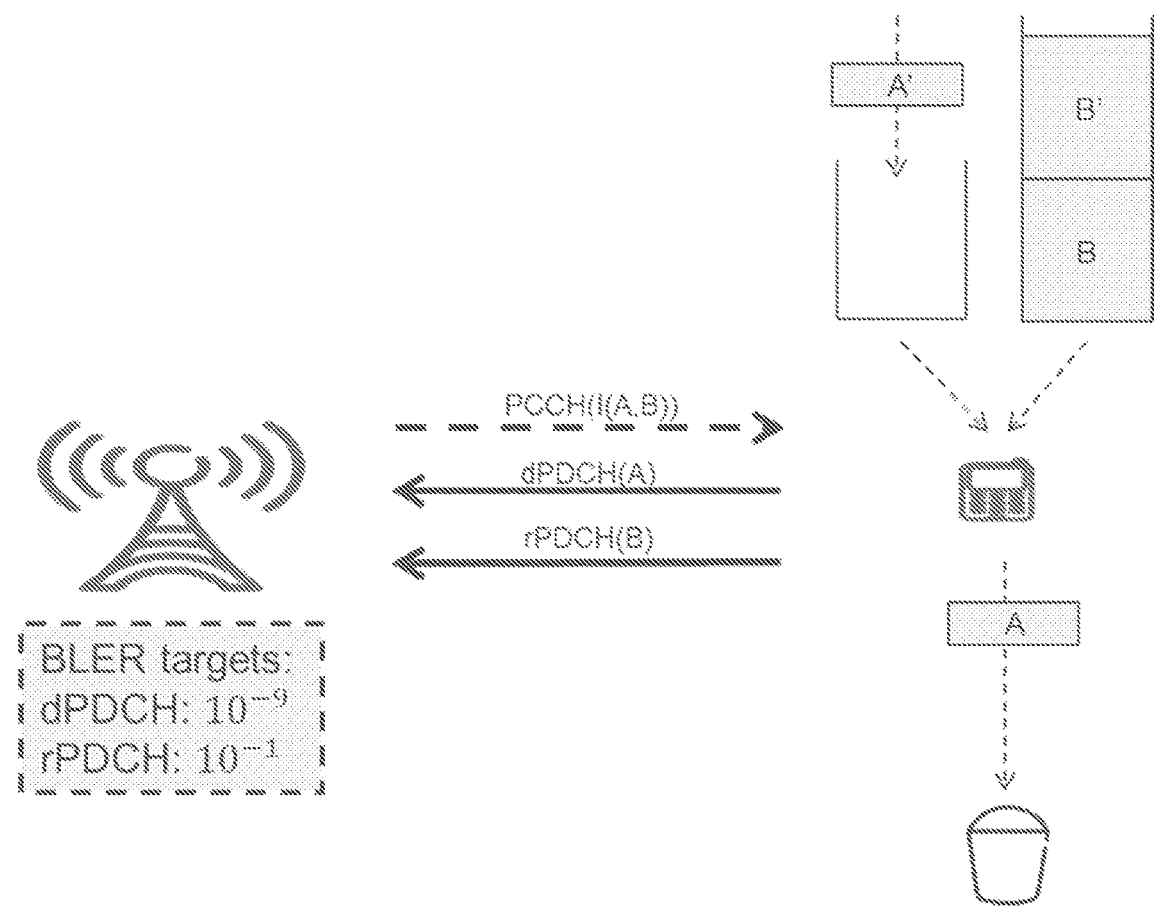
FIG. 2 illustrates a second example scenario using direct and retransmittable channels.

FIG. 2 shows another illustrative scenario, in this case where a UE is transmitting two types of data. A first type is rapid-reporting data, with high robustness requirements. This data, designated "A" in the figure, is sent on the direct channel (dPDCH), using encoding that provides a high degree of reliability, such as a Block Error Rate (BLER) of $10^{-9}$. The second type of data, designated "B" in the figure, is bulk data, which is transmitted in a throughput-optimized manner, using HARQ, on the retransmittable channel (rPDCH). In the illustrated example, the data is less heavily encoded, e.g., using an encoding/decoding algorithm that is less computationally complex, with a BLER target of only $10^{-1}$. Since there are no strict latency requirements on the bulk data, the use of lighter encoding with relatively frequent retransmissions may represent the most spectrally efficient way to move the data from one node to the other.

A control channel message sent on a control channel (designated "PCCH" in FIG. 2) may inform the UE of which uplink resources are to be used for sending the direct channel and retransmittable channel. As suggested by the figure, this control channel message may, in some embodiments, explicitly assign resources for each of the dPDCH and the rPDCH. In other embodiments, however, the resources for one channel may be derived from a grant message allocating resources for the other channel. Further, the dashed arrow in FIG. 2 illustrates that for some embodiments there is no PCCH. In some of these embodiments, the mapping of the data channels to uplink resources may be obtained using blind decoding, as described in further detail below.

The UE has obtained one or more message mapping rules that map messages arriving in a first queue, i.e., messages A, A', . . . , onto the dPDCH, and messages arriving in a second queue, i.e., messages, B, B', . . . , onto rPDCH. The message mapping rule or rules may in some embodiments be obtained by receiving a configuration message that explicitly instructs the UE to map a message flow A, A', . . . on dPDCH and/or to map other messages B, B', . . . on rPDCH. In other embodiments, mapping rules based on traffic type classification may be programmed into the UE, e.g., based on a standardized rule from a specification or based on traffic classification and rules specific to the UE. In still other embodiments, a combination of signaled and predetermined mapping rules may be used.

In the illustrated scenario, flow A, A' . . . consists of data messages that are mission-critical data that must be delivered with very low error probability and also with very low latency. Hence, the data messages A, A', . . . will not benefit from re-transmissions and are mapped to the direct channel. On the other hand, the other flow B, B', . . . consists of bulk data with moderate latency requirements and for which it is desirable to optimize for throughput.

Note that once the UE has transmitted a message A on dPDCH it may discard A (illustrated by the bucket in the figure), since the UE will not be requested to perform a re-transmission for A. In other words, the UE does not maintain a HARQ retransmission process for messages sent on the direct channel. For a message B sent on rPDCH, however, the UE may be requested to perform a re-transmission. Hence, the UE maintains the message B (or, more specifically, an encoded block of the message B), so that is prepared for a re-transmission request after the initial transmission on rPDCH has occurred.

As suggested several times above, in some embodiments of the techniques described herein, there is no physical control channel (e.g., PCCH) that provides an explicit allocation of resources for the direct and retransmittable channels. In some such embodiments, a UE receiving messages on a dPDCH and rPDCH performs one or more decoding attempts of dPDCH within a predetermined search space. The search space specifies one or more possible assignments of a dPDCH or rPDCH, e.g. specifying a location for one or more time-frequency locations and/or encoding methods and/or one or more other transmission parameters such as transmission rank, modulation, and code rate. The UE performs a decoding attempt of a dPDCH (or rPDCH) for one or more of the possible assignments in the search space. The assignment of rPDCH is in some such embodiments carried by the dPDCH that is found by this blind decoding approach, in some embodiments. In other embodiments, an explicit assignment of dPDCH may be found in a rPDCH message found by following this blind decoding approach.

Figure 3:
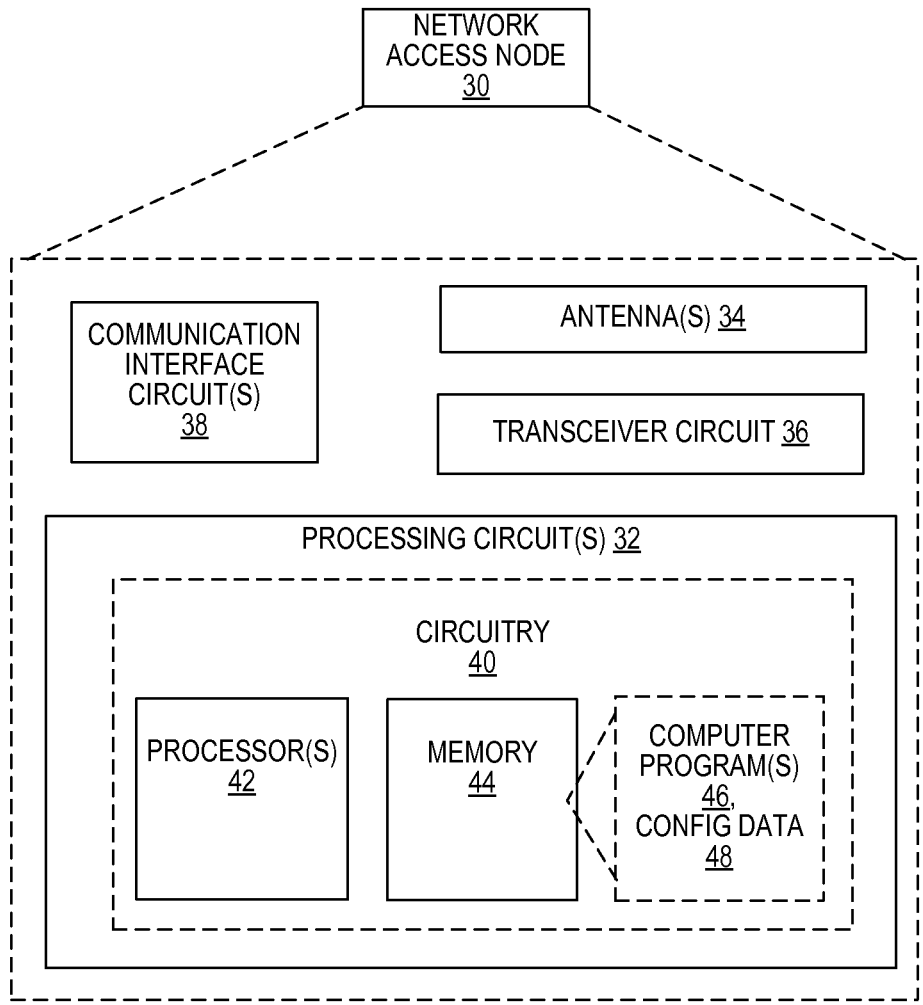
FIG. 3 is a block diagram illustrating an example network access node, according to some embodiments of the present invention.

FIG. 3 illustrates a diagram of a network access node 30, which may be configured to carry out one of more of the above-described techniques, in various embodiments. The network access node 30 provides an air interface to a wireless device, e.g., an LTE air interface or WLAN air interface for downlink transmission and uplink reception, which is implemented via antennas 34 and a transceiver circuit 36. The transceiver circuit 36 may include transmitter circuits, receiver circuits, and associated control circuits that are collectively configured to transmit and receive signals according to a radio access technology, for the purposes of providing cellular communication or WLAN services, depending on the type of network access node. According to various embodiments, cellular communication services may be operated according to any one or more of the 3GPP cellular standards, GSM, GPRS, WCDMA, HSDPA, LTE and LTE-Advanced. WLAN services may be operated according to IEEE 802.11 standards, but are not limited to these standards.

The network access node 30 may also include communication interface circuits 38 for communicating with nodes in the core network, other peer radio nodes, and/or other types of nodes in the network. The network access node 30 may be, for example, a base station such as an eNodeB. The network access node 30 may also be, for example, an indoor device or a device for a small cell. For example, network access node 30 may be an indoor picocell device configured to provide services to wireless devices within a building, femtocell, or picocell. In some embodiments, the network access node 30 may be a WLAN access point (AP).

The radio access network node 30 also includes one or more processing circuits 32 that are operatively associated with and configured to control the communication interface circuit(s) 38 and/or the transceiver circuit 36. The processing circuit 32 comprises one or more digital processors 42, e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any combination thereof. More generally, the processing circuit 32 may comprise fixed circuitry, or programmable circuitry that is specially configured via the execution of program instructions implementing the functionality taught herein, or may comprise some combination of fixed and programmable circuitry. The processor(s) 42 may be multi-core.

The processing circuit 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any combination thereof. By way of non-limiting example, the memory 44 may comprise any one or more of SRAM, DRAM, EEPROM, and FLASH memory, which may be in the processing circuit 32 and/or separate from the processing circuit 32. In general, the memory 44 comprises one or more types of computer-readable storage media providing non-transitory storage of the computer program 46 and any configuration data 48 used by the node 30. Here, "non-transitory" means permanent, semi-permanent, or at least temporarily persistent storage and encompasses both long-term storage in non-volatile memory and storage in working memory, e.g., for program execution.

In some embodiments, network access node 30 is configured to act as the sending, or transmitting, node according to one or more of the techniques described above. Accordingly, in some embodiments the processing circuit 32 is configured to send a set of Layer 2 (L2) messages to a second wireless device, using first and second physical data channels. More particularly, processing circuit 32 is configured, in some embodiments, to transmit a first subset of the L2 messages on the first physical data channel and transmit a second, mutually exclusive, subset of the L2 messages on the second physical data channel, using the radio transceiver, where the first and second subsets are determined by one or more mapping rules. The processing circuit 32 is further configured to retain each message in the first subset until receipt of the corresponding message by the second wireless device is acknowledged, and is still further configured to refrain from re-transmitting at least some messages in the second subset of messages that are unsuccessfully received by the second wireless device. In some embodiments, this means that each message in the second subset is discarded, without waiting for acknowledgement of receipt of the corresponding message by the second wireless device. In these embodiments, the first wireless node does not need to know whether or not the messages were successfully received. In other embodiments, this refraining from re-transmitting at least some unsuccessfully received messages in the second subset of messages comprises refraining from re-transmitting one or more messages for which negative acknowledgements are received from the second wireless node—this may be based on determining that each of the one or more messages is no longer up to date, for example.

In some of these and in other embodiments, the network access node 30 acts as a receiving node according to one or more of the techniques described above, in addition to or instead of acting as a sending node. In these embodiments, processing circuit 32 is thus configured to receive a set of L2 messages from a second wireless device, using first and second physical data channels. More particularly, processing circuit 32 in some embodiments is configured to receive from the second wireless device, using the radio transceiver, a first subset of the messages on the first physical data channel and a second, mutually exclusive, subset of the messages on the second physical data channel. The processing circuit 32 is further configured to transmit one or more acknowledgements or negative acknowledgements to the second wireless device for messages in the first subset, using the radio transceiver and to retain decoding-related information for unsuccessfully decoded messages in the first subset, for use with subsequent retransmission of the unsuccessfully decoded messages. However, the processing circuit is configured to discard decoding-related information for unsuccessfully decoded messages in the second subset, without waiting for retransmissions of the unsuccessfully decoded messages. In some variants, processing circuit 32 transmits one or more acknowledgements or negative acknowledgements for received messages in the second subset, for use by the second wireless node in performing link adaptation. However, the message handling circuitry in these embodiments does not expect retransmissions of unsuccessfully decoded messages in the second subset, and thus does not retain decoding information for these unsuccessfully decoded messages.

In some cases, the network access node is an eNodeB in an LTE network and the second wireless device is a user equipment (UE), which may be referred to, in various contexts, as a mobile station, a mobile telephone, a wireless device, a cellular handset, etc.

Figure 4:
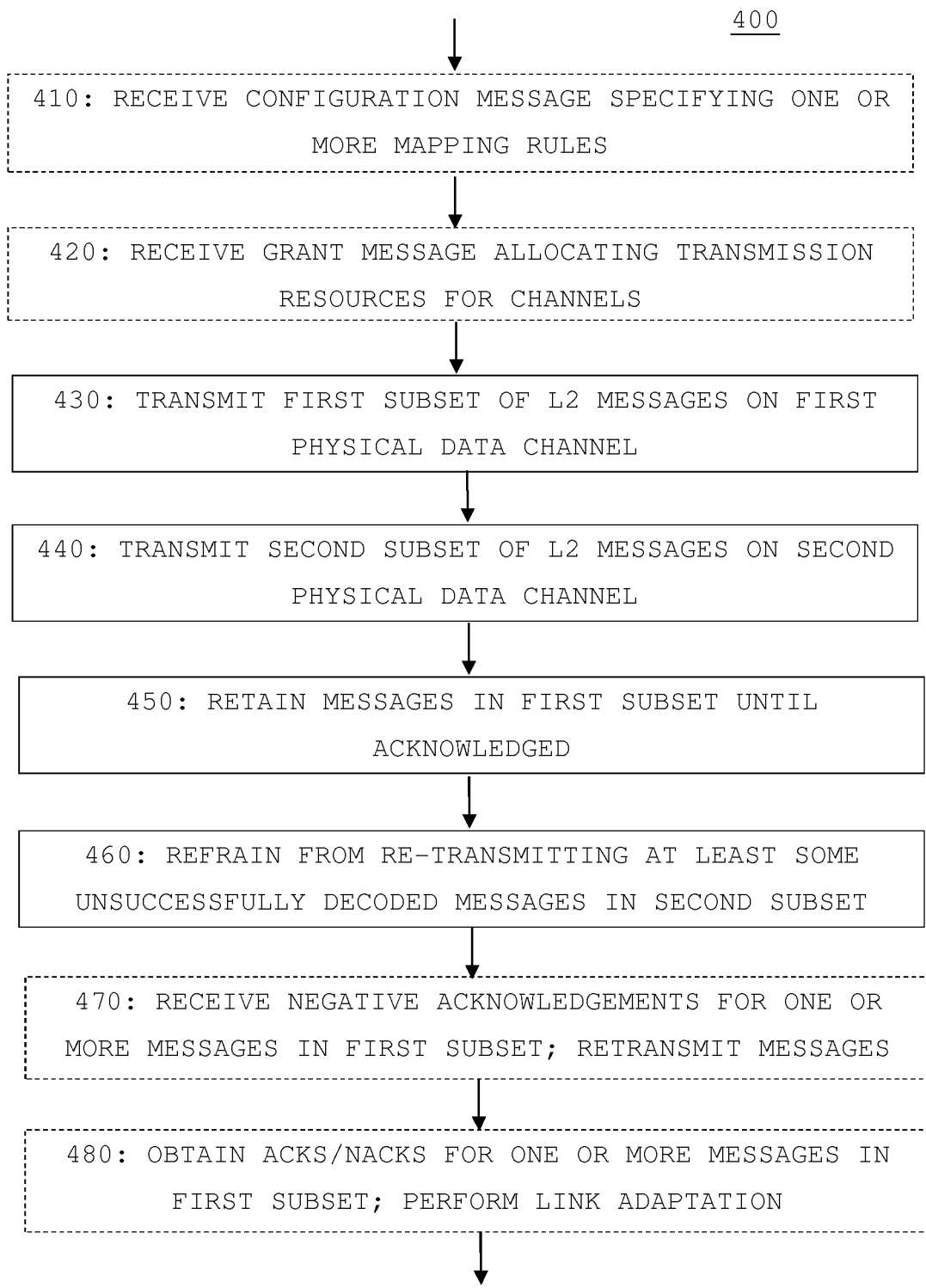
FIG. 4 is a process flow diagram showing an example method, according to some embodiments.
Figure 5:
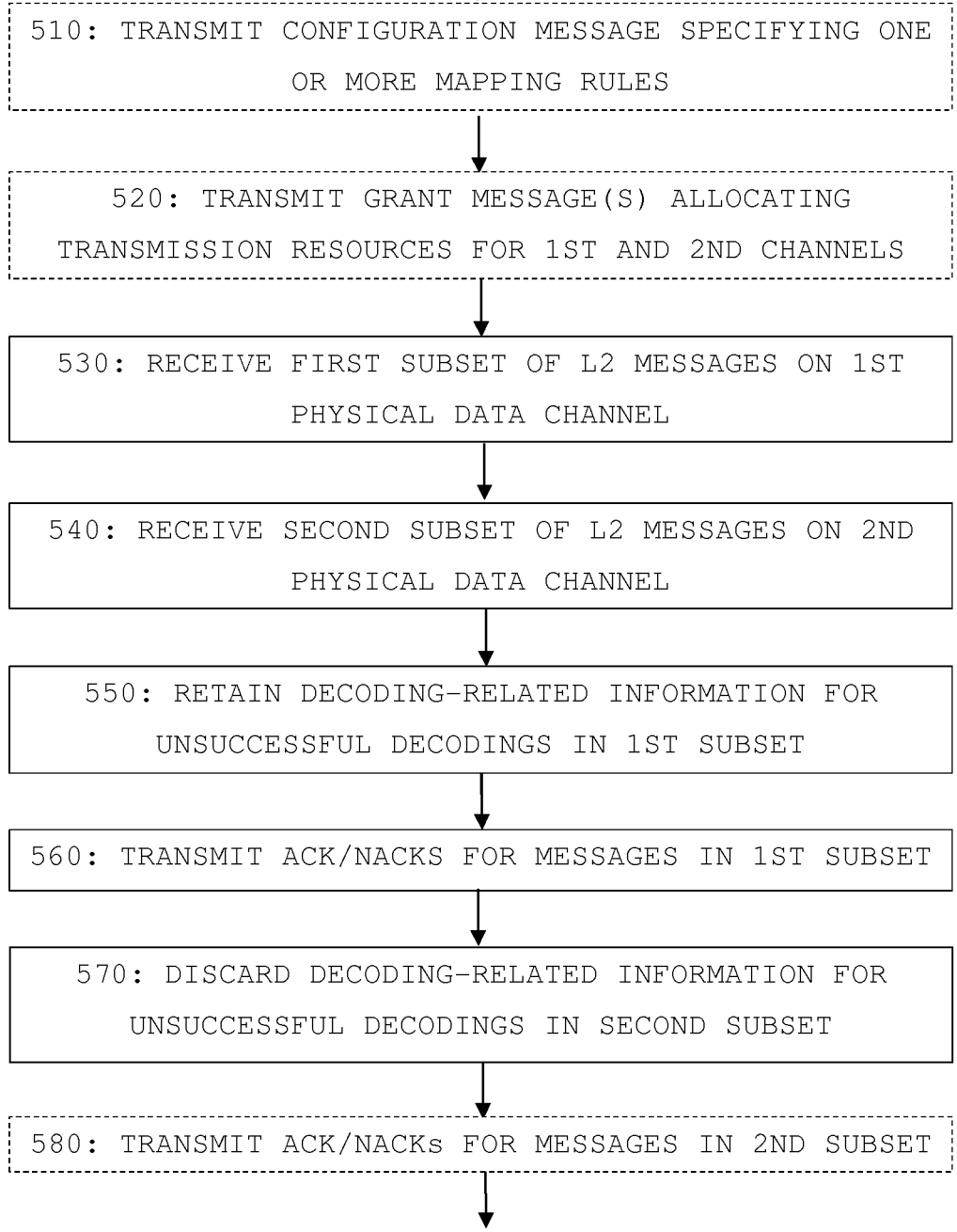
FIG. 5 is a process flow diagram illustrating another example method, according to some embodiments.

Regardless of its specific implementation details, processing circuit 32 of network access node 30 is configured to perform a method according to one or more of the techniques described, such as method 400 of FIG. 4 and/or method 500 of FIG. 5. It will be appreciated that method 400, as illustrated in FIG. 4, corresponds to a wireless device acting as a sending node, according to the techniques already described, while method 500, shown in FIG. 4, corresponds to a wireless device acting as a receiving node.

FIG. 4's method 400, then, is a method in a first wireless node, for transmitting a set of L2 messages to a second wireless node, using first and second physical data channels. This first wireless node may be a base station or other network access node, such as network access node 30, or may be a UE, as discussed in further detail below.

As seen at blocks 430 and 440, the method of FIG. 4 includes transmitting a first subset of the L2 messages on the first physical data channel and transmitting a second, mutually exclusive, subset of the L2 messages on the second physical data channel, where the first and second subsets are determined by one or more mapping rules. It will be appreciated that these steps are not carried out in any particular order—the transmitting on the first and second channels may be simultaneous.

As shown at block 450, the method includes retaining each message in the first subset until receipt of the corresponding message by the second wireless node is acknowledged. If a negative acknowledgement for one of these messages is subsequently received, for example, it can be immediately retransmitted, for use by the second wireless node in combining with decoding-related information from the first, unsuccessful decoding attempt. In contrast, however, as seen at block 460, the method comprises refraining from re-transmitting at least some messages in the second subset of messages that are unsuccessfully decoded by the second wireless node.

In some embodiments, this refraining from re-transmitting at least some messages in the second subset of messages comprises discarding each message in the second subset without waiting for acknowledgement of receipt of the corresponding message by the second wireless node. In other embodiments, this refraining from re-transmitting at least some messages in the second subset of messages comprises refraining from re-transmitting one or more messages in the second subset for which negative acknowledgements are received from the second wireless node. This may be based, for example, on determining that each of these one or more messages is no longer up to date, such that it would no longer be useful at the receiving node after a retransmission. This may apply to certain very time-sensitive messages, for example.

In some embodiments of the method illustrated in FIG. 4, one or more of the mapping rules is predetermined, according to an industry standard. In some of these and in some other embodiments, one or more of the mapping rules are obtained, prior to the transmitting of the first and second subsets of L2 messages, by receiving a configuration message that specifies one or more mapping rules, i.e., indicating for at least one of the first and second subsets of L2 messages, at least one data flow or category of data that should be mapped to the at least one of the first and second subsets of messages. This is shown at block 410, which is outlined with a dashed line to indicate that this may not occur in every embodiment or instance of the illustrated method. In these embodiments, then, the transmitting of the first and second subsets of messages comprises mapping a plurality of data flows or a plurality of categories, or both, to the first and second subsets of L2 messages, in accordance with the configuration message.

In some embodiments, the example method of FIG. 4 further includes, prior to said transmitting of the first and second subsets of L2 messages, classifying each of a plurality of data items according to traffic type and selectively mapping data items to the first and second subsets of L2 messages according to the traffic types for the data items and according to one or more of the mapping rules. This classifying may be based, for example, on one or more of the following: latency requirements for one or more of the data items; decoding error probabilities for one or more of the data items; and delivery criticalities for one or more of the data items.

In some embodiments, one or more grant messages allocating transmission resources to the first wireless node for each of the first and second physical data channels are received, prior to the transmitting of the first and second subsets of L2 messages. In these embodiments, the transmitting of the first and second subsets of the L2 messages is performed using the allocated transmission resources. This receiving of grant messages is shown at block 420, which again is shown with a dashed outline to indicate that this step need not occur in every embodiment and/or instance of the illustrated method. For instance, this step might take place in a UE acting as a transmitting node, but may not be used in a base station acting as a transmitting node.

In some embodiments, the first and second subsets of L2 messages are encoded using first and second encoding algorithms, respectively, one of the first and second encoding algorithms having a higher spectral efficiency than the other—in these embodiments, the transmitting of the first and second subsets of L2 messages comprises transmitting the encoded messages resulting from said encoding. Similarly, in some embodiments, the first and second subsets of L2 messages are encoded using first and second encoding algorithms, respectively, one of the first and second encoding algorithms having a higher complexity than the other. Again, the transmitting of the first and second subsets of L2 messages in these embodiments comprises transmitting the encoded messages resulting from said encoding.

In some embodiments or instances, negative acknowledgements are received for one or more messages in the first subset of L2 messages, and those messages in the first subset of L2 messages that correspond to the received negative acknowledgements are retransmitted. This is shown at block 470. While in some embodiments no acknowledgements or negative acknowledgements are sent or received for messages in the second subset of L2 messages, in other embodiments the methods summarized above may further comprise obtaining one or more acknowledgements and/or negative acknowledgements for messages in the second subset of L2 messages and adjusting one or more transmission parameters for the second physical data channel, based on the received acknowledgements and/or negative acknowledgements. This is shown at block 480, which once more is shown with a dashed outline to indicate that it need not apply to all instances or embodiments.

Method 500, as illustrated in FIG. 5, is a method in a first wireless node for receiving a set of L2 messages from a second wireless node, using first and second physical data channels. Once again, this first wireless node may be a base station or other network access node, such as network access node 30, or may be a UE, as discussed in further detail below.

As shown at blocks 530 and 540, the method includes receiving, from the second wireless node, a first subset of the L2 messages on the first physical data channel, and receiving, from the second wireless node, a second, mutually exclusive, subset of the L2 messages on the second physical data channel. Once again, it will be appreciated that these steps are not carried out in any particular order—the receiving on the first and second channels may be simultaneous.

As shown at block 550, the method further comprises retaining decoding-related information for unsuccessfully decoded messages in the first subset, for use with subsequent retransmissions of the unsuccessfully decoded messages. The method further comprises transmitting one or more acknowledgements or negative acknowledgements to the second wireless node for messages in the first subset, as shown at block 560. As shown at block 570, the method comprises discarding decoding-related information for unsuccessfully decoded messages in the second subset, without waiting for retransmissions of the unsuccessfully decoded messages. It will be appreciated that this discarding of the decoding-related information need not be immediate. In some embodiments, for example, the decoding-related information might simply be overwritten at some later point, e.g., when decoding a subsequent message. The point here is that the decoding-related information for unsuccessfully decoded messages in the second subset, in contrast to the corresponding information for unsuccessfully decoded messages in the first subset, is not retained for soft combining with retransmitted versions of the unsuccessfully decoded messages, if there are any.

While one or more acknowledgements or negative acknowledgements are transmitted to the second wireless node for messages in the first subset, in the method shown in FIG. 5, acknowledgements and/or negative acknowledgements may or may not be transmitted for messages in the second subset, in various embodiments. In some embodiments, one or more acknowledgements or negative acknowledgements are transmitted for received messages in the second subset, for use by the second wireless node in performing link adaptation. This is also shown in block 580, which is illustrated with a dashed outline to indicate that it may not appear in every instance or embodiment of the illustrated method. However, it will be appreciated that the first wireless node in these embodiments does not expect retransmissions of unsuccessfully decoded messages in the second subset, and thus does not retain decoding information for these unsuccessfully decoded messages.

According to some embodiments of method 500, the method includes, prior to receiving the first and second subsets of L2 messages, transmitting to the second wireless node a configuration message indicating, for at least one of the first and second subsets of L2 messages, at least one data flow or category of data that should be mapped to the at least one of the first and second subsets of L2 messages. This is shown at block 510, which is shown with a dashed outline to indicate that it need not appear in every embodiment or instance of the method.

In some of these and in some other embodiments, the method further includes transmitting one or more grant messages allocating transmission resources to the second wireless node for each of the first and second physical data channels, prior to receiving the first and second subsets of L2 messages, where the receiving of the first and second subsets of the L2 messages is performed using the allocated transmission resources. This is shown at block 520, which again is shown with a dashed outline to indicate that it need not appear in every embodiment or instance of the method. Indeed, in some other embodiments, the method instead comprises receiving, along with the first and second subsets of L2 messages, one or more scheduling grants indicating transmission resources allocated to each of the first and second physical data channels.

In some embodiments, the receiving of the first and second subsets of L2 messages comprises, for at least one message in the second subset, performing a plurality of decoding attempts in a predetermined search space to find the one message in the second subset. In some of these embodiments, resource assignment information for a message in the first subset is determined from the one message in the second subset, and the message in the first subset is received, using this resource assignment information.

In some embodiments, the first and second subsets of L2 messages are decoded using first and second decoding algorithms, respectively, one of the first and second decoding algorithms having a higher spectral efficiency than the other. Similarly, in some embodiments the first and second subsets of L2 messages are decoded using first and second decoding algorithms, respectively, one of the first and second decoding algorithms having a higher complexity than the other.

Figure 6:
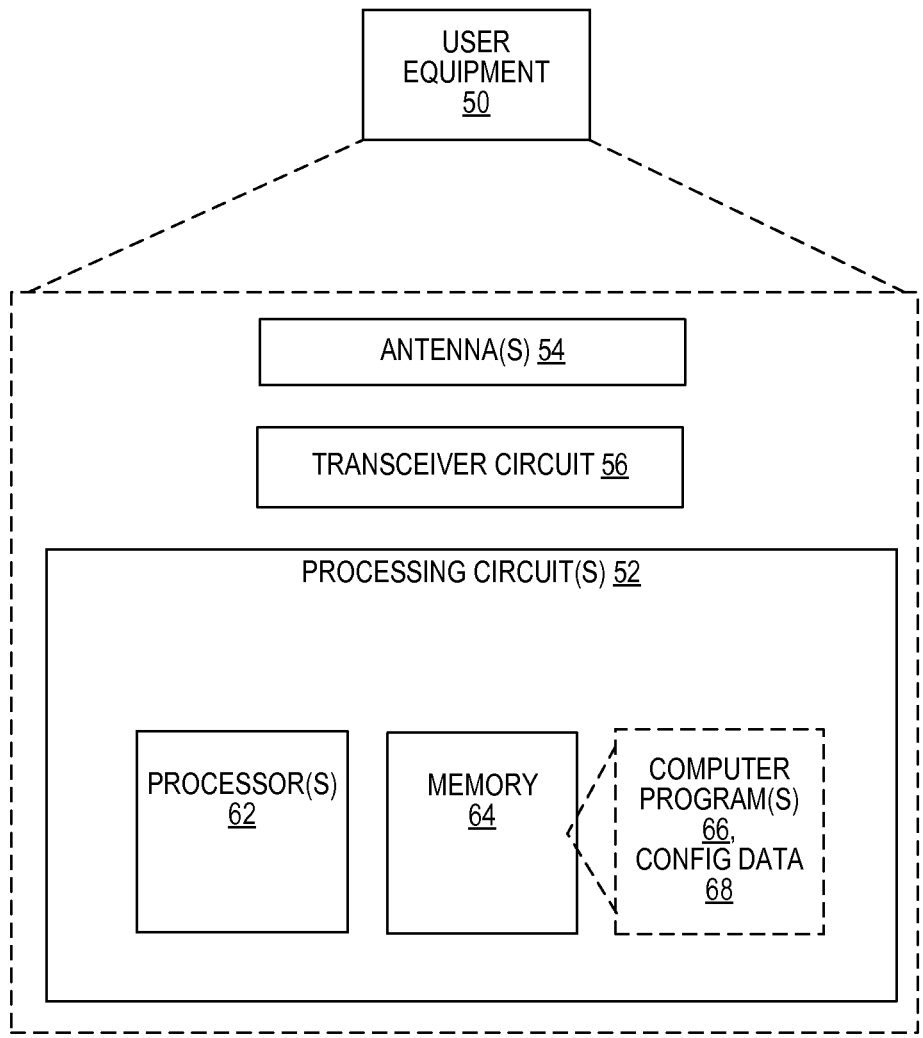
FIG. 6 is a block diagram illustrating an example user equipment.

As discussed above, the methods 400 and 500 illustrated in FIGS. 4 and 5, respectively, may be carried out by a base station or other network access node, such as the network access node 30 illustrated in FIG. 3. Either or both of these methods, and/or variants thereof, may also be carried out by an appropriately configured user equipment (UE). FIG. 6 illustrates an example user equipment 50, according to some embodiments. User equipment 50 may also be considered to represent any wireless devices that may operate in a network. The UE 50 herein can be any type of wireless device capable of communicating with network node or another UE over radio signals. The UE 50 may also be referred to, in various contexts, as a radio communication device, a target device, a device-to-device (D2D) UE, a machine-type UE or UE capable of machine to machine (M2M) communication, a sensor-equipped UE, a PDA (personal digital assistant), a wireless tablet, a mobile terminal, a smart phone, laptop-embedded equipment (LEE), laptop-mounted equipment (LME), a wireless USB dongle, a Customer Premises Equipment (CPE), etc.

UE 50 communicates with a radio node or base station, such as the radio access network node 30, via antennas 54 and a transceiver circuit 56. The transceiver circuit 56 may include transmitter circuits, receiver circuits, and associated control circuits that are collectively configured to transmit and receive signals according to a radio access technology, for the purposes of providing cellular communication services.

The UE 50 also includes one or more processing circuits 52 that are operatively associated with and control the radio transceiver circuit 56. The processing circuit 52 comprises one or more digital processing circuits, e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any mix thereof. More generally, the processing circuit 52 may comprise fixed circuitry, or programmable circuitry that is specially adapted via the execution of program instructions implementing the functionality taught herein, or may comprise some mix of fixed and programmed circuitry. The processing circuit 52 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the user equipment 50.

The UE 50 is configured to perform to one or more of the techniques described above, such as one or both of the methods illustrated in FIGS. 4 and 5, or variants thereof.

Thus, for example, in some embodiments, processing circuit 52 is configured to control the UE 50 so that it acts as the sending, or transmitting, node according to one or more of the techniques described above. Accordingly, in some embodiments processing circuit 52 is configured to send a set of Layer 2 (L2) messages to a second wireless device, using first and second physical data channels. More particularly, processing circuit 52 is configured, in some embodiments, to transmit a first subset of the L2 messages on the first physical data channel and transmit a second, mutually exclusive, subset of the L2 messages on the second physical data channel, using the radio transceiver, where the first and second subsets are determined by one or more mapping rules. The processing circuit 52 is further configured to retain each message in the first subset until receipt of the corresponding message by the second wireless device is acknowledged, and to refrain from re-transmitting at least some messages in the second subset of messages that are unsuccessfully decoded by the second wireless node, e.g., by discarding each message in the second subset without waiting for acknowledgement of receipt of the corresponding message by the second wireless device.

In some of these and in other embodiments, the UE 50 acts as a receiving node according to one or more of the techniques described above, in addition to or instead of acting as a sending node. In these embodiments, processing circuit 52 is thus configured to receive a set of L2 messages from a second wireless device, using first and second physical data channels. More particularly, processing circuit 52 in some embodiments is configured to receive from the second wireless device, using the radio transceiver, a first subset of the messages on the first physical data channel and a second, mutually exclusive, subset of the messages on the second physical data channel. The processing circuit 52 is further configured to transmit one or more acknowledgements or negative acknowledgements to the second wireless device for messages in the first subset, using the radio transceiver and to retain decoding-related information for unsuccessfully decoded messages in the first subset, for use with subsequent retransmission of the unsuccessfully decoded messages. However, the processing circuit is configured to discard decoding-related information for unsuccessfully decoded messages in the second subset, without waiting for retransmissions of the unsuccessfully decoded messages. In some embodiments, the processing circuit is configured to refrain from transmitting acknowledgements to the second wireless node for received messages in the second subset. In some variants, processing circuit 52 does not refrain from sending acknowledgements to the second wireless node for received messages in the second subset, but may instead transmit one or more acknowledgements or negative acknowledgements for received messages in the second subset, e.g., for use by the second wireless node in performing link adaptation. However, the processing circuit 52 in these embodiments does not expect retransmissions of unsuccessfully decoded messages in the second subset, and thus does not retain decoding information for these unsuccessfully decoded messages.

As discussed in detail above, the techniques described herein, e.g., as illustrated in the process flow diagrams of FIGS. 4 and 5, may be implemented, in whole or in part, using computer program instructions executed by one or more processors. It will be appreciated that a functional implementation of these techniques, whether in a network access node 30 or UE 50, may be represented in terms of functional modules, where each functional module corresponds to a functional unit of software executing in an appropriate processor or to a functional digital hardware circuit, or some combination of both.

Figure 7:
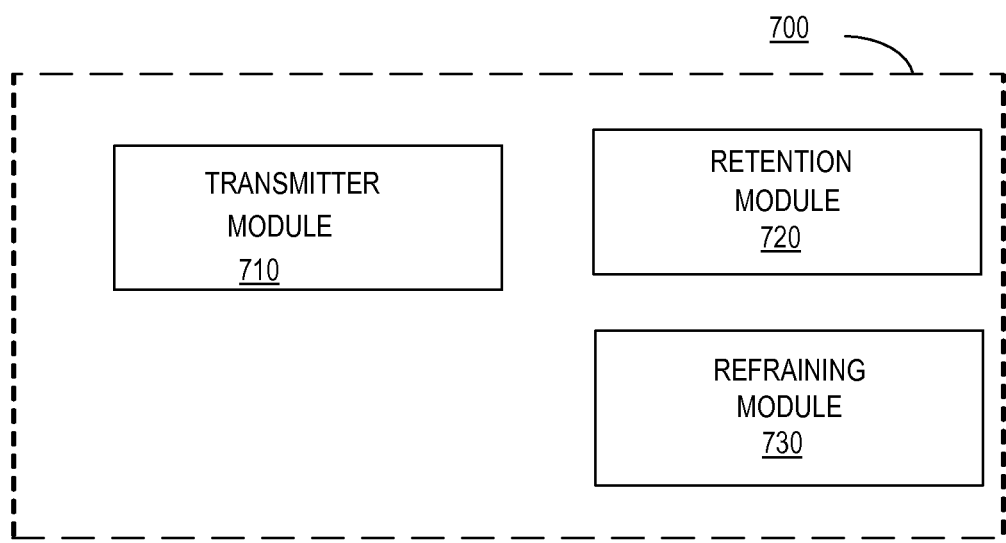
FIG. 7 is a block diagram of a functional implementation of a wireless device configured according to some embodiments of the present invention.

FIG. 7 illustrates an example functional module or circuit architecture as may be implemented in a wireless device operating as a sending node according to the techniques described herein, such as a network access node 30 or UE 50. FIG. 7 thus illustrates a wireless device 700 that includes a transmitter module 710 for transmitting a first subset of the L2 messages on the first physical data channel and transmitting a second, mutually exclusive, subset of the L2 messages on the second physical data channel, where the first and second subsets are determined by one or more mapping rules. Wireless device 700 further includes a retention module 720 for retaining each message in the first subset until receipt of the corresponding message by the second wireless device is acknowledged, and a refraining module (730) from re-transmitting at least some messages in the second subset of messages that are unsuccessfully decoded by the second wireless node. Variants of wireless device 700 corresponding to the several variants of method 400, described above, are possible—thus, wireless device 700 may include one or more additional functional modules implementing any additional functionality corresponding to those variants.

Figure 8:
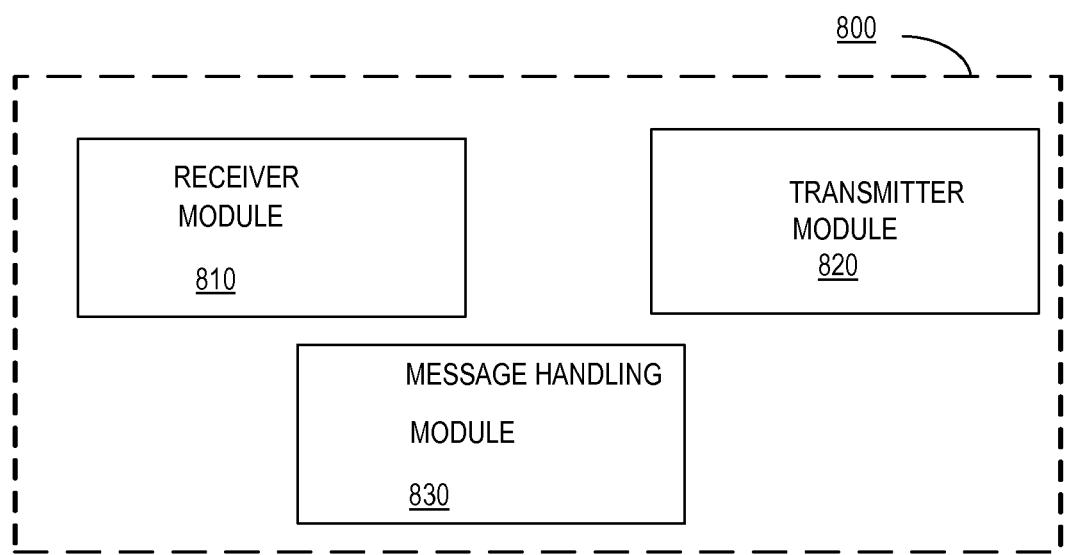
FIG. 8 is a block diagram of another functional implementation of a wireless device configured according to some embodiments of the present invention.

Similarly, FIG. 8 illustrates an example functional module or circuit architecture as may be implemented in a wireless device operating as a receiving node according to the techniques described herein, such as a network access node 30 or UE 50. FIG. 8 thus illustrates a wireless device 800 that includes a receiver module 810 for receiving, from the second wireless device, a first subset of the messages on the first physical data channel and a second, mutually exclusive, subset of the messages on the second physical data channel. Wireless device 800 further includes a transmitter module 820 for transmitting one or more acknowledgements or negative acknowledgements to the second wireless device for messages in the first subset and a message handling module 830 for discarding decoding-related information for unsuccessfully decoded messages in the second subset, without waiting for retransmissions of the unsuccessfully decoded messages. It will be appreciated that the functional implementations shown in FIGS. 7 and 8 may appear in the same device, in some embodiments.

Detailed above are methods and apparatus in which a first and a second channel are used for communicating direct information and re-transmittable information, respectively. The first and second channels are characterized by that they are separately encoded and, in some embodiments, use separate link adaptation. In embodiments where the direct channel uses an error detecting code (such as a CRC), for example, this error detecting code is distinct from the error detecting code used for the re-transmittable channel.

The terms first and second channel, as used herein, should be broadly understood, e.g., so as to include implementations where the channels are referred to as "subchannels" or "fields" of a single physical channel. These channels/subchannels/fields may, for example use the same demodulation reference signal and/or the same synchronization signal, but maintain separate encoding.

Methods and corresponding apparatus for dynamically mapping data to the two channels dependent on the characteristics of the given data element were detailed above. Other embodiments of the presently disclosed techniques include computer program products comprising computer program instructions that, when executed by a processor on a wireless device, cause the wireless device to carry out one or more of the techniques detailed herein. Still other embodiments include computer-readable media, including non-transitory computer-medium, in which one or more such computer program products are stored or conveyed.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, in a first wireless node, for receiving a set of Layer 2 (L2) messages from a second wireless node, using first and second physical data channels, the method comprising:
   receiving, from the second wireless node, a first subset of the L2 messages on the first physical data channel;
   receiving, from the second wireless node, a second, mutually exclusive, subset of the L2 messages on the second physical data channel;
   retaining decoding-related information for unsuccessfully decoded messages in the first subset, for use with subsequent retransmissions of the unsuccessfully decoded messages;
   transmitting one or more acknowledgements or negative acknowledgements to the second wireless node for messages in the first subset; and
   discarding decoding-related information for unsuccessfully decoded messages in the second subset, without waiting for retransmissions of the unsuccessfully decoded messages.

2. The method of claim 1, further comprising transmitting one or more acknowledgements or negative acknowledgements to the second wireless node for received messages in the second subset.

3. The method of claim 1, further comprising, prior to said receiving of the first and second subsets of L2 messages, transmitting to the second wireless node a configuration message indicating, for at least one of the first and second subsets of L2 messages, at least one data flow or category of data that should be mapped to the at least one of the first and second subsets of L2 messages.

4. The method of claim 1, further comprising, prior to said receiving of the first and second subsets of L2 messages, transmitting one or more grant messages allocating transmission resources to the second wireless node for each of the first and second physical data channels, wherein said receiving of the first and second subsets of the L2 messages is performed using the allocated transmission resources.

5. The method of claim 1, further comprising, receiving, along with the first and second subsets of L2 messages, one or more scheduling grants indicating transmission resources allocated to each of the first and second physical data channels.

6. The method of claim 1, wherein the receiving of the first and second subsets of L2 messages comprises performing a plurality of decoding attempts in a predetermined search space to find at least one message in the second subset.

7. The method of claim 6, further comprising:
   determining, from the at least one message in the second subset, resource assignment information for a message in the first subset; and receiving the message in the first subset using the resource assignment information.

8. The method of claim 1, further comprising decoding the first and second subsets of L2 messages using first and second decoding algorithms, respectively, one of the first and second decoding algorithms having a higher spectral efficiency than the other.

9. The method of claim 1, further comprising decoding the first and second subsets of L2 messages using first and second decoding algorithms, respectively, one of the first and second decoding algorithms having a higher complexity than the other.

10. A method, in a first wireless node, for transmitting a set of Layer 2 (L2) messages to a second wireless node, using first and second physical data channels, the method comprising:
   transmitting a first subset of the L2 messages on the first physical data channel and transmitting a second, mutually exclusive, subset of the L2 messages on the second physical data channel, wherein the first and second subsets are determined by one or more mapping rules;
   retaining each message in the first subset until receipt of the corresponding message by the second wireless node is acknowledged;
   refraining from re-transmitting at least some messages in the second subset of messages that are unsuccessfully decoded by the second wireless node; and
   discarding each particular message in the second subset without waiting for acknowledgement of receipt of the particular message by the second wireless node.

11. The method of claim 10, wherein refraining from re-transmitting at least some messages in the second subset of messages comprises refraining from re-transmitting one or more messages in the second subset for which negative acknowledgements are received from the second wireless node.

12. The method of claim 11, wherein said refraining from re-transmitting one or more messages in the second subset for which negative acknowledgements are received is based on determining that each of the one or more messages is no longer up to date.

13. The method of claim 10, further comprising, prior to said transmitting of the first and second subsets of L2 messages:
   obtaining one or more of the mapping rules by receiving a configuration message indicating, for at least one of the first and second subsets of L2 messages, at least one data flow or category of data that should be mapped to the at least one of the first and second subsets of messages; and
   mapping a plurality of data flows or a plurality of categories, or both, to the first and second subsets of L2 messages, in accordance with the configuration message.

14. The method of claim 10, wherein one or more of the mapping rules is predetermined, according to an industry standard.

15. The method of claim 10, further comprising, prior to said transmitting of the first and second subsets of L2 messages:
   classifying each of a plurality of data items according to traffic type; and
   selectively mapping data items to the first and second subsets of L2 messages according to the traffic types for the data items and according to one or more of the mapping rules.

16. The method of claim 15, wherein said classifying is based on one or more of the following:
   latency requirements for one or more of the data items;
   decoding error probabilities for one or more of the data items; and
   delivery criticalities for one or more of the data items.

17. The method of claim 10, further comprising, prior to said transmitting of the first and second subsets of L2 messages, receiving one or more grant messages allocating transmission resources to the first wireless node for each of the first and second physical data channels, wherein said transmitting of the first and second subsets of the L2 messages is performed using the allocated transmission resources.

18. The method of claim 10, further comprising, prior to said transmitting of the first and second subsets of L2 messages, encoding the first and second subsets of L2 messages using first and second encoding algorithms, respectively, one of the first and second encoding algorithms having a higher spectral efficiency than the other, wherein said transmitting of the first and second subsets of L2 messages comprises transmitting the encoded messages resulting from said encoding.

19. The method of claim 10, further comprising, prior to said transmitting of the first and second subsets of L2 messages, encoding the first and second subsets of L2 messages using first and second encoding algorithms, respectively, one of the first and second encoding algorithms having a higher complexity than the other, wherein said transmitting of the first and second subsets of L2 messages comprises transmitting the encoded messages resulting from said encoding.

20. The method of claim 10, further comprising obtaining one or more acknowledgements and/or negative acknowledgements for messages in the second subset of L2 messages and adjusting one or more transmission parameters for the second physical data channel, based on the received acknowledgements and/or negative acknowledgements.

21. The method of claim 20, further comprising:
   receiving negative acknowledgements for one or more messages in the first subset of L2 messages; and
   retransmitting the one or more messages, in response to the received negative acknowledgements.

22. The method of claim 21, wherein said retransmitting of the one or more messages is further in response to determining that each of the one or more messages is up to date.

23. A wireless device for receiving a set of Layer 2 (L2) messages from a second wireless device, using first and second physical data channels, wherein the wireless device comprises
   a radio transceiver, and
   processing circuit configured to control the radio transceiver and to:
      receive from the second wireless device, using the radio transceiver, a first subset of the messages on the first physical data channel;
      receive, from the second wireless device, using the radio transceiver, a second, mutually exclusive, subset of the messages on the second physical data channel;
      retain decoding-related information for unsuccessfully decoded messages in the first subset, for use with subsequent retransmissions of the unsuccessfully decoded messages;

transmit one or more acknowledgements or negative acknowledgements to the second wireless device for messages in the first subset, using the radio transceiver; and discard decoding-related information for unsuccessfully decoded messages in the second subset, without waiting for retransmissions of the unsuccessfully decoded messages.

24. The wireless device of claim 23, wherein the processing circuit is further configured to transmit one or more acknowledgements or negative acknowledgements to the second wireless device for received messages in the second subset.

25. The wireless device of claim 23, wherein the processing circuit is further configured to, prior to receiving the first and second subsets of L2 messages, transmit to the second wireless node a configuration message indicating, for at least one of the first and second subsets of L2 messages, at least one data flow or category of data that should be mapped to the at least one of the first and second subsets of L2 messages.

26. The wireless device of claim 23, wherein the processing circuit is configured to perform a plurality of decoding attempts in a predetermined search space to find at least one message in the second subset.

27. The wireless device of claim 26, wherein the processing circuit is further configured to:
determine, from the at least one message in the second subset, resource assignment information for a message in the first subset; and
receive the message in the first subset using the resource assignment information.

28. A wireless device for sending a set of Layer 2 (L2) messages to a second wireless device, using first and second physical data channels, wherein the wireless device comprises
a radio transceiver, and
a processing circuit configured to control the radio transceiver and to:
transmit a first subset of the L2 messages on the first physical data channel and transmit a second, mutually exclusive, subset of the L2 messages on the second physical data channel, using the radio transceiver, wherein the first and second subsets are determined by one or more mapping rules;
retain each message in the first subset until receipt of the corresponding message by the second wireless device is acknowledged;
refrain from re-transmitting at least some messages in the second subset of messages that are unsuccessfully decoded by the second wireless node; and
discard each message in the second subset without waiting for acknowledgement of receipt of the corresponding message by the second wireless device.

29. The wireless device of claim 28, wherein the processing circuit is configured to refrain from re-transmitting one or more messages in the second subset for which negative acknowledgements are received from the second wireless node.

30. The wireless device of claim 28, wherein the processing circuit is further configured to, prior to transmitting the first and second subsets of L2 messages:
classify each of a plurality of data items according to traffic type; and
selectively map data items to the first and second subsets of L2 messages according to the traffic types for the data items and according to one or more of the mapping rules.

31. The wireless device of claim 20, wherein the processing circuit is configured to classify the data items based on one or more of the following:
latency requirements for one or more of the data items;
decoding error probabilities for one or more of the data items; and
delivery criticalities for one or more of the data items.

32. The wireless device of claim 28, wherein the processing circuit is further configured to:
obtain one or more acknowledgements and/or negative acknowledgements for messages in the second subset of L2 messages; and
adjust one or more transmission parameters for the second physical data channel, based on the received acknowledgements and/or negative acknowledgements.

* * * * *